March 4, 1924.

1,485,704

R. P. PESCARA

AIRCRAFT

Filed Aug. 29, 1922     3 Sheets-Sheet 3

RAUL PATERAS PESCARA

*Inventor:*

PER

ATTORNEY

Patented Mar. 4, 1924.

1,485,704

UNITED STATES PATENT OFFICE.

RAUL PATERAS PESCARA, OF BARCELONA, SPAIN.

AIRCRAFT.

Application filed August 29, 1922. Serial No. 585,092.

*To all whom it may concern:*

Be it known that I, RAUL PATERAS PESCARA, a citizen of Argentina, residing at 20 Calle de la Buena Suerte, Barcelona, in the Kingdom of Spain, have invented certain new and useful Improvements in Aircraft, of which the following is a specification.

In order to produce a flying machine heavier than air which shall yield satisfactory and safe results in commercial practice, it is necessary above all things to solve the problem of the greatest possible variation of the speed. At present, the aeroplane, which permits of great velocity of flight being obtained with satisfactory efficiency, is unable to rise from the ground or to land except at a speed which is always high, and, up to the present time, whatever efforts have been made to improve these conditions of working have not yielded the desired result.

Of all the solutions which present themselves for the solving of this very interesting problem there is the possibility, at least theoretically, of varying the area of the surface presented to the air so as to diminish the load per square metre. As, however, the speed is strictly proportional to the square root of the said surface, it becomes necessary to effect very important variations. For this reason, all the means, some of which are exceedingly complicated mechanically, which are based on this principle, have, up to the present time, broken down in practice.

The rotating plane, which constitutes the subject matter of the present invention and to which the present specification refers, is an aeroplane the supporting surface of which can be varied within very wide limits due to the utilization of the well known properties of "auto-rotation," i. e. rotation of the planes due to the movement of the machine through the air and without any mechanical drive. In actual fact, a stationary surface, presented to the air at a certain angle of incidence, furnishes a certain thrust, which is proportional to its area, but the same surface is able, under similar conditions and if also capable of revolving by auto-rotation around an axis at right angles to its larger dimension, to then furnish a thrust which is proportional to the area of the circle swept through by it. The area of the circle swept through by such a surface, taking into account the proportions usual in aviation, is approximately equal to four and a half times the area of the revolving surface. On the other hand, the effect of the auto-rotation is to augment the quality, and, if desired, the co-efficient of support, in such a manner that the thrust obtained by a rotating surface which sweeps through an area equal to the surface of the said plane, is capable of attaining a much higher value. To sum up, the act of causing a supporting surface to revolve by auto-rotation produces an increase in the thrust which is equal to a variation of its area in considerable proportion. This result has never been obtained by any of the means devised up to the present time.

The working of the rotating plane is deduced directly from these considerations. An apparatus of this kind will rise from the ground and land again utilizing for this purpose the auto-rotation of its supporting surfaces, which will permit it to rise from the ground and land again thereon at a minimum speed. On the contrary on attaining a certain height, the rotary movement of the wings can be decreased progressively until they remain stationary, when the apparatus will act as an ordinary aeroplane and will then be capable of attaining its maximum velocity.

Figure 1:
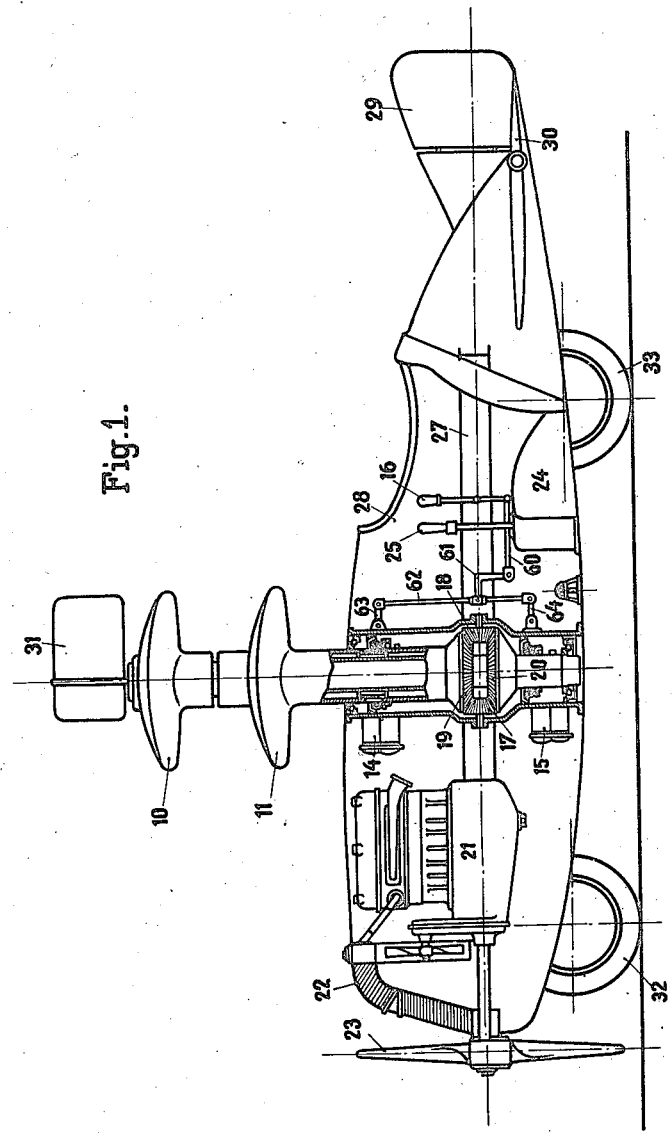
Figures 1 and 2 show, by way of example, an apparatus of this type in longitudinal section and plan respectively.
Figure 2:
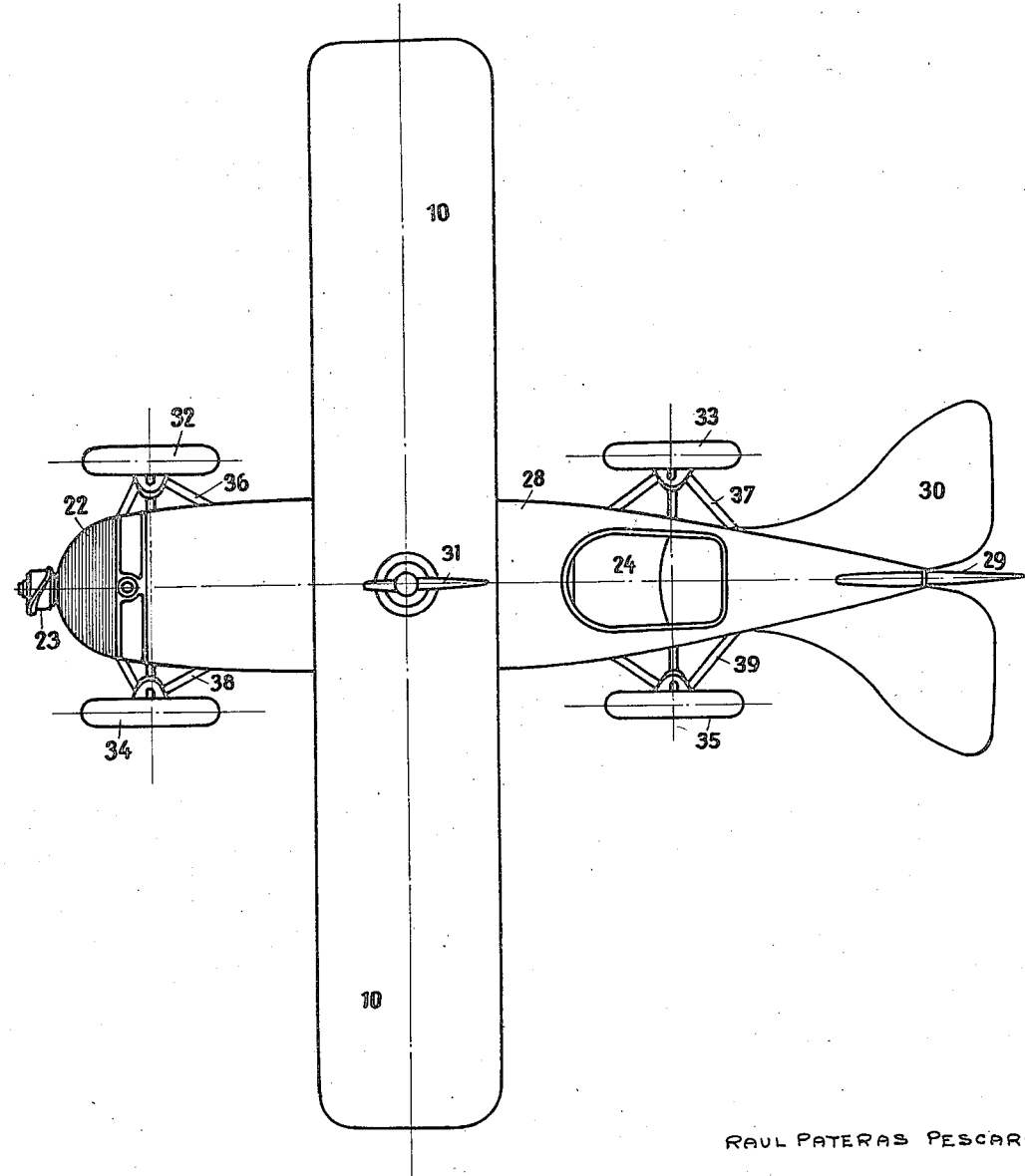

On examining the said drawings there will be seen:

1. The supporting planes 10 and 11, each of which in the present constructional example, is constructed of a plane similar to the thick wing of a monoplane without guys and the outline of which is symmetrical and the angle of incidence zero.

Their hubs 12 and 13 which can rotate in opposite directions.

Devices 14 and 15 for setting and locking the said planes and controlled by the lever 16.

A differential gearing composed of the wheels 19 and 20 and the satellites 17 and 18. The object of this differential gearing is to rotate the planes 10 and 11 at speeds which are relatively equal with respect to the body or fuselage of the machine. This device is not essential but its use is almost obligatory if rotating planes revolving in opposite directions are employed.

2. A motor 21 and its radiator 22.

3. A tractor screw 23 driven by the motor 21.

4. The seat 24 for the pilot and if necessary the like for passengers.

5. A system for controlling the steering and stability of the apparatus worked by a joy stick 25.

6. A rigid frame 27 carrying the various parts of the apparatus.

7. A body or fuselage 28.

8. Rudders for steering and stabilizing; 29 steering rudder, 30 diving rudders 31 balancing rudder.

9. A landing set composed of four wheels 32, 33, 34, 35 suitable frames 36, 37, 38, 39 and elastic devices which are not shown and which are similar to those commonly used on aeroplanes.

Figure 3:
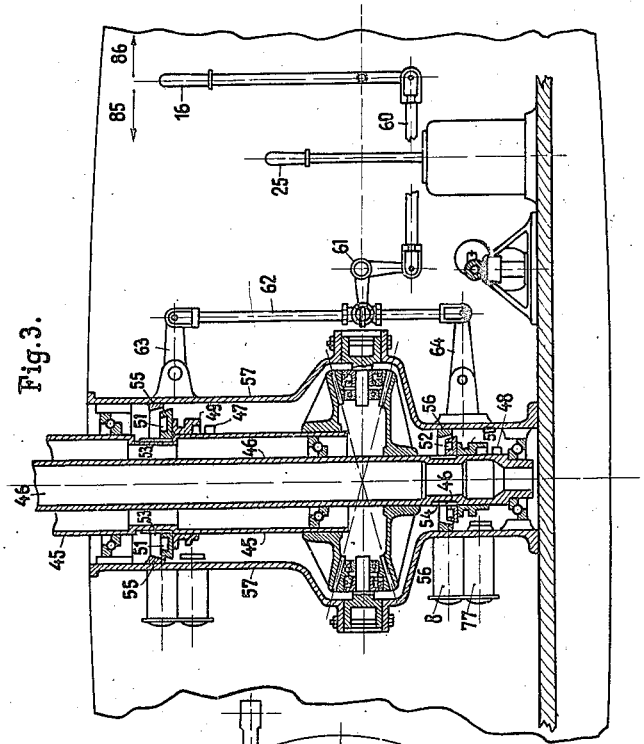
Figure 3 is a detail vertical section showing the locking mechanism for the planes.

For the sake of greater clearness the system for setting and locking the supporting planes will be hereinafter described in detail, with reference to Figures 3 and 4.

The object of this arrangement is to stop the rotation of the supporting screws and to lock them in a proper position.

The hubs 45 and 46 (the latter one being shown in horizontal section in Figure 4) carry lugs 47, 48 adapted to engage in corresponding grooves in sleeves 49, 50. In contact with these sleeves and in the upper parts thereof are mounted parts 51, 52, locked to the hubs by ribs 53, 54 which can slide between them. The cones 55, 56 rigidly attached to the casing 57 are placed opposite the conical parts 51, 52 so that when the sleeves rise great friction is produced between the conical rotating parts and the stationary ones which checks the movement of the hubs.

The working of the said sleeves is controlled by the lever 16 and the mechanism composed of the parts 61, 62, 63 and 64 the action of which does not require any explanation.

Figure 4:
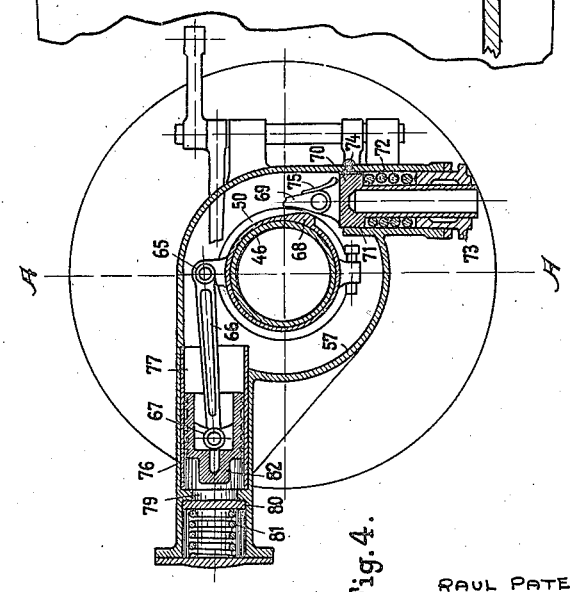
Figure 4 is a horizontal section of the same to an enlarged scale.

Referring now to the arrangement of the mechanism shown in the section A—A Figure 4 it will be seen that the sleeve 50 carries a lug 65 to which is pivoted the end of a connecting rod 66 the head of which is attached to a piston 67. The sleeve 50 carries likewise a ratchet tooth 68 which corresponds to the pawl 69, pivoted to a piston 70, working in a horizontal cylinder 71 cast in one piece with the casing 57. A powerful spring 72, held in position by the gland 73 forces the piston 70 outwards causing it to strike against an adjustable stop 74. A small spring 75 tends to cause the pawl 69 to rub against the surface of the sleeve.

The piston 76 works in a cylinder 77 which is filled with oil and communicates at its upper part by ports with another cylinder 78 which is closed and filled with air under a suitable pressure. Towards the end of the cylinder 77 is provided a shoulder 79 against which is held a disc 80 by the pressure of a powerful spring 81. Finally the piston 76 has one part 82 of smaller diameter which can pass through the opening left by the shoulder 79.

The arrangement works in the following manner:—In the figure the sleeve is shown in such a position that it does not impede the movements of the hubs 45, 46 of the screws. If at some determined moment, it be deemed convenient to lock the planes it is sufficient in order to do so:

1. To move the lever 16 forwards (see the arrow 85) the effect of which is to cause the sleeves 49, 50 to rise until the conical parts 51, 52 come into contact with the cones 55, 56 on the casing. The screws are then checked and their speed of rotation begins to decrease.

2. To move the lever 16 in the opposite direction (see the arrow 86) when the speed of rotation has diminished sufficiently. The sleeve 50 descends in such a way that its tooth comes into contact with the tooth 48. The sleeve is thereby locked to the hub and the rotary movement of the said hub rigidly connected to the supporting planes becomes progressively checked in consequence of the increasing resistance which results from the action of the piston 76, forcing the oil into the upper cylinder 78. The moment the part 82 of lesser diameter comes into contact with the disc 80 the pawl 69 drops down into its recess past the tooth 68. If the momentum of the masses in rotation has been completely absorbed by the work corresponding to the movement of the oil and the compression of the air, the planes will then be locked in the proper position for their new action as planes. If on the contrary an excess of momentum is left in the blades, the part 82 of smaller diameter will strike against the disc 80 compressing consequently the powerful spring 81, the piston sliding past under the action of the said pressure. The tooth 68 then bears against the pawl 69 and compresses the other spring 72. From all this there result certain oscillations until equilibrium is established which is obtained under such conditions that neither the piston 76 is subjected to any force on the part of the spring 81 nor the spring 72 acts on the pawl 68. Whatever variation takes place in this equilibrium is then elastic but can be instantly corrected and the planes remain stationary and parallel. In this respect in fact the position of the teeth 47, 48 has been calculated in order that the relative position of the planes may be that which is most suitable.

The movement of the same lever 16 which has then raised the sleeve 50, sets at liberty the tooth 48 and consequently the hub of the supporting planes which can act on another occasion as screws.

What I claim and desire to secure by Letters Patent of the United States is:

1. An aeroplane having a supporting surface mounted to rotate freely about an axis perpendicular to its larger dimension, means for driving the machine, and means for braking and locking the supporting surface to permit of the latter turning by "auto-rotation" or serving as a fixed plane.

2. An aeroplane having supporting planes adapted to rotate freely by "auto-rotation" about an upright axis, means for driving the machine, and means for reducing the speed of rotation of the planes and for locking same in a fixed position for travel at maximum speed.

3. An aeroplane having a pair of supporting wings of symmetrical outline and free to turn by "auto-rotation" about an axis perpendicular to their larger dimensions, differential gearing between the wings, means for driving the machine and means for reducing the speed of rotation and for locking the wings to permit of the latter either rotating by "auto-rotation" or remaining in fixed position as aeroplane supporting surfaces.

4. An aeroplane having a supporting surface mounted to rotate freely by "auto-rotation" about an axis perpendicular to its larger dimension, means for driving the machine, and means comprising a hydraulic device, pneumatic cushioning means, and spring buffer devices for reducing the speed of rotation of the supporting surface and for locking same in fixed position to permit of the said surface either turning by "auto-rotation" or remaining stationary as a supporting plane.

In testimony whereof I affix my signature in presence of two witnesses.

RAUL PATERAS PESCARA.

Witnesses:
   ANGEL M. VAUX,
   EDWARD C. CROPPER.